(12) United States Patent
Kikkawa et al.

(10) Patent No.: US 11,633,269 B2
(45) Date of Patent: Apr. 25, 2023

(54) METHOD OF MANUFACTURING INTER-DENTAL CLEANING TOOL

(71) Applicant: KOBAYASHI PHARMACEUTICAL CO., LTD., Osaka (JP)

(72) Inventors: Tasuku Kikkawa, Osaka (JP); Shinji Yuumei, Toyama (JP)

(73) Assignee: KOBAYASHI PHARMACEUTICAL CO., LTD., Osaka (JP)

( * ) Notice: Subject to any disclaimer, the term of this patent is extended or adjusted under 35 U.S.C. 154(b) by 871 days.

(21) Appl. No.: 16/482,210

(22) PCT Filed: Feb. 14, 2018

(86) PCT No.: PCT/JP2018/005014
§ 371 (c)(1),
(2) Date: Jul. 30, 2019

(87) PCT Pub. No.: WO2018/173552
PCT Pub. Date: Sep. 27, 2018

(65) Prior Publication Data
US 2019/0343608 A1    Nov. 14, 2019

(30) Foreign Application Priority Data

Mar. 23, 2017  (JP) .............................. JP2017-057626

(51) Int. Cl.
*B29C 45/16*    (2006.01)
*A61C 15/02*    (2006.01)
(Continued)

(52) U.S. Cl.
CPC .............. *A61C 15/02* (2013.01); *A46D 3/005* (2013.01); *B29C 45/1676* (2013.01); *A46B 2200/108* (2013.01); *B29C 33/44* (2013.01)

(58) Field of Classification Search
CPC .......................... A46D 3/005; B29C 45/1676
See application file for complete search history.

(56) References Cited

U.S. PATENT DOCUMENTS

| 2015/0114428 A1 | 4/2015 | Kato |
| 2017/0189148 A1 | 7/2017 | Kato |
| 2018/0256298 A1 | 9/2018 | Kikkawa |

FOREIGN PATENT DOCUMENTS

| JP | 2003-21758 A  | 1/2003 |
| JP | 2004-209242 A | 7/2004 |

(Continued)

OTHER PUBLICATIONS

International Search Report for International Application No. PCT/JP2018/005014 dated May 1, 2018 (3 pages, 1 page translation).

*Primary Examiner* — Timothy Kennedy
*Assistant Examiner* — Farah Taufiq
(74) *Attorney, Agent, or Firm* — Kratz, Quintos & Hanson, LLP

(57) ABSTRACT

In order to prevent shaft portion from being broken in ejection of base portion from mold, method for manufacturing interdental cleaning tool includes: base portion forming step of forming base portion by filling first space of primary mold (50) with synthetic resin, which includes first and second mold members (50A, 50B); and cleaning portion forming step of forming cleaning portion around shaft portion by filling second space of secondary mold with elastomer. Base portion forming step uses first and second mold members (50A, 50B). First and second molds include: first and second contact surfaces (51A, 51B); pair of first and second spaced-apart portions (54A, 54B); and first and second connection portions (52A, 52B), angle (θ) between each of first and second spaced-apart portions (54A, 54B) and separation plane being acute.

9 Claims, 7 Drawing Sheets

(51) Int. Cl.
   *A46D 3/00*      (2006.01)
   *B29C 33/44*     (2006.01)

(56)         References Cited

FOREIGN PATENT DOCUMENTS

WO     2013/176297 A1    11/2013
WO     2017/038654 A1     3/2017
WO     WO-2017038654 A1 *  3/2017   ......... A46B 15/0093

* cited by examiner

METHOD OF MANUFACTURING INTER-DENTAL CLEANING TOOL

TECHNICAL FIELD

The present invention relates to a method for manufacturing an interdental cleaning tool.

BACKGROUND ART

Interdental cleaning tools for cleaning an interdental space have been conventionally known. For example, Patent Literature 1 discloses an interdental cleaning tool including a base portion extending in a specific direction, and a cleaning portion made of elastomer. The base portion has a shaft portion, which has a shape extending straight to be inserted into an interdental space, and a grip portion, which has a shape to be gripped by fingers. The shaft portion has a circular cross-section (on a plane in a direction orthogonal to an axial direction of the shaft portion). The grip portion is connected to the shaft portion and has a flat plate shape. The cleaning portion is a portion for cleaning the interdental space, and covers a part of the circumferential surface of the shaft portion.

The interdental cleaning tool is manufactured by a base portion forming step and a cleaning portion forming step. In the base portion forming step, the base portion is formed by injecting a synthetic resin (e.g. polypropylene) into a primary mold which has a first space having a shape in correspondence to the base portion. The primary mold is constituted by an upper mold member and a lower mold member. A separation plane of the upper and lower mold members is set to a plane which encompasses an axis of the shaft portion. In short, the base portion forming step includes: filling the space between the upper and lower mold members with the synthetic resin; separating the upper and lower mold members from each other; and ejecting the base portion remaining in the upper or lower mold member from the mold. Thereafter, in the cleaning portion forming step, the cleaning portion is formed by filling a second space with elastomer under a condition in which a secondary mold holds the base portion, the secondary mold being configured to hold the base portion and having a shape forming the second space around the shaft portion.

CITATION LIST

Patent Literature

Patent Literature 1: WO 2013/176297 A

SUMMARY OF INVENTION

The method for manufacturing an interdental cleaning tool as disclosed in Patent Literature 1 has a problem that the shaft portion is likely to be damaged (or broken) in the base portion forming step when the base portion is ejected from the mold. In detail, when the base portion is ejected from the mold, the base portion is pulled out from the mold (in a direction perpendicular to a separation plane of the mold) under a condition that the grip portion is gripped. The pulling action is likely to apply an excessive load to the shaft portion.

An object of the present invention is to provide a method for manufacturing an interdental cleaning tool, the method making it possible to prevent a shaft portion from being broken when the base portion is ejected from a mold.

In order to solve the aforementioned problem, the present invention provides a method for manufacturing an interdental cleaning tool including: a base portion having a shaft portion, which extends in a specific direction and has a shape to be inserted into an interdental space, and a grip portion, which is connected to the shaft portion and has a shape to be gripped by fingers; and a cleaning portion configured to clean the interdental space and covering at least a part of the shaft portion, the method including: a base portion forming step of forming the base portion by using a primary mold having a first space in correspondence to the base portion and filling the first space with a synthetic resin, the primary mold including a first mold member and a second mold member separable from each other on a separation plane which is a reference plane encompassing an axis of the shaft portion; and a cleaning portion forming step of forming the cleaning portion around the shaft portion by using a secondary mold configured to hold the base portion and having a shape forming a second space in correspondence to the cleaning portion around the shaft portion, and filling the second space with elastomer under a condition in which the secondary mold holds the base portion, wherein what is used as the first mold member in the base portion forming step includes a first contact surface defining the separation plane and coming into contact with the second mold member; a pair of first spaced-apart portions, each of which has a flat surface that becomes gradually more distant from the separation plane as the flat surface becomes more distant along the separation plane from the first contact surface; and a first connection portion which connects the first spaced-apart portions with each other and has a shape that is convex so as to become more distant from the separation plane in a direction perpendicular to the separation plane, an angle between each of the first spaced-apart portions and the separation plane being acute, and wherein what is used as the second mold member in the base portion forming step includes a second contact surface defining the separation plane and coming into contact with the first contact surface; a pair of second spaced-apart portions, each of which has a flat surface that becomes gradually more distant from the separation plane as the flat surface becomes more distant along the separation plane from the second contact surface; and a second connection portion, which connects the second spaced-apart portions with each other and has a shape that is convex so as to become more distant from the separation plane in a direction perpendicular to the separation plane, an angle between each of the second spaced-apart portions and the separation plane being acute.

The base portion forming step in the method for manufacturing the interdental cleaning tool uses the first mold member in which the angle between each of the first spaced-apart portions and the separation plane is acute, and the second mold member in which the angle between each of the second spaced-apart portions and the separation plane is acute. This configuration makes it possible to reduce a force applied to the shaft portion when the base portion remaining in either of the first and second mold members is ejected from the mold under a condition in which the grip portion of the base portion is gripped after the first and second mold members are separated from each other in the base portion forming step. Accordingly, the shaft portion is prevented from being broken when the base portion is ejected from the primary mold in the base portion forming step.

In this case, what is used as the first mold member includes the first connection portion which has a curved shape that is convex so as to become more distant from the separation plane in a direction perpendicular to the separation plane, and what is used as the second mold member includes the second connection portion which has a curved shape that is convex so as to become more distant from the separation plane in a direction perpendicular to the separation plane.

With regard to this configuration, an inwardly convex shape is formed at a boundary between a portion of the circumferential surface of the shaft portion, which is formed by the connection portion, and another portion of the circumferential surface of the shaft portion, which is formed by the spaced-apart portions, in the base portion forming step. The boundary restricts a rotation of the cleaning portion around the shaft portion in the circumferential direction to suppress a relative rotation of the cleaning portion formed in the cleaning portion forming step to the shaft portion in the circumferential direction.

The present invention also provides a method for manufacturing an interdental cleaning tool including: a base portion having a shaft portion, which extends in a specific direction and has a shape to be inserted into an interdental space, and a grip portion, which is connected to the shaft portion and has a shape to be gripped by fingers; and a cleaning portion configured to clean the interdental space and covering at least a part of the shaft portion, the method including: a base portion forming step of forming the base portion by using a primary mold having a first space in correspondence to the base portion and filling the first space with a synthetic resin, the primary mold including a first mold member and a second mold member separable from each other on a separation plane which is a reference plane encompassing an axis of the shaft portion; and a cleaning portion forming step of forming the cleaning portion around the shaft portion by using a secondary mold configured to hold the base portion and having a shape forming a second space in correspondence to the cleaning portion around the shaft portion, and filling the second space with elastomer under a condition in which the secondary mold holds the base portion, wherein what is used as the first mold member in the base portion forming step includes a first contact surface defining the separation plane and coming into contact with the second mold member; a pair of first spaced-apart portions, each of which has a surface curved so as to be convex toward the separation surface, the surface becoming gradually more distant from the separation plane as the surface becomes more distant along the separation plane from the second contact surface; and a first connection portion, which connects the first spaced-apart portions with each other and has a curved shape that is convex so as to become more distant from the separation plane in a direction perpendicular to the separation plane, an angle between a tangential plane at a vertex of each of the first spaced-apart portions and the separation plane being acute, and wherein what is used as the second mold member in the base portion forming step includes a second contact surface defining the separation plane and coming into contact with the first contact surface; a pair of second spaced-apart portions, each of which has a surface curved so as to be convex toward the separation surface, the surface being gradually more distant from the separation plane as the surface becomes more distant along the separation surface from the second contact surface; and a second connection portion, which connects the second spaced-apart portions with each other and has a curving shape that is convex so as to become more distant from the separation plane in a direction perpendicular to the separation plane, an angle between a tangential plane at a vertex of each of the second spaced-apart portions and the separation plane being acute.

What is used as the first mold member in the base portion forming step of the method for manufacturing an interdental cleaning tool has an acute angle between a tangential plane at a vertex of each of the first spaced-apart portions and the separation plane and what is used as the second mold member has an acute angle between a tangential plane at a vertex of each of the second spaced-apart portions and the separation plane. Accordingly, the shaft portion is prevented from being broken when the base portion is ejected from the primary mold in the base portion forming step according to this method as well. An inwardly convex shape is formed in the base portion forming step at a boundary between a portion of the circumferential surface of the shaft portion of the base portion, which is formed by the connection portion, and another portion of the circumferential portion of the shaft portion, which is formed by the curved portion. Therefore, a relative rotation of the cleaning portion to the shaft portion is suppressed.

It is preferable in the method for manufacturing an interdental cleaning tool that what is used as the secondary mold in the cleaning portion forming step includes a cleaner main body forming portion for forming a cleaner main body which constitutes a part of the cleaning portion and covers at least a part of a circumferential surface of the shaft portion; and a brush portion forming portion for forming a plurality of brush portions which constitute another part of the cleaning portion and respectively protrude outward from a circumferential surface of the cleaner main body in directions orthogonal to an axial direction of the shaft portion, wherein in the cleaning portion forming step, the second space is filled with the elastomer under a condition in which the secondary mold holds the base portion so that a ridge formed by the first spaced-apart portion and the second spaced-apart portion in the base forming step overlaps with a part of the brush portion forming portion in an axis-orthogonal direction which is orthogonal to the axial direction of the shaft portion.

The interdental cleaning tool manufactured in this manner has the cleaning portion provided with the brush portions, a part of the brush portions being supported by the ridge of the shaft portion. Accordingly, the cleanness of an interdental space by the brush portions may be enhanced.

In this case, what is used as the secondary mold in the cleaning portion forming step is configured to form the cleaner main body having a thinner portion which overlaps with the ridge in the axis-orthogonal direction than another part of the cleaner main body, which overlaps in the axis-orthogonal direction with a shaft main body formed by the first and second connection portions in the base portion forming step.

The cleaner main body formed in the cleaning portion forming step consequently has a relatively hard portion and a relatively soft portion. A user thus may change feeling of use.

In detail, it is preferable that what is formed in the cleaning portion forming step has a ratio of no less than 75% and no more than 99.95% of the portion which overlaps with the ridge in the axis-orthogonal direction to the part of the cleaner main body overlapping in the axis-orthogonal direction with the shaft main body.

The feeling of use may be more effectively changed.

In this case, it is preferable that what is formed in the base forming step, the base portion is formed so that the grip portion has a larger size in a direction in parallel to the separation plane than a size in a direction orthogonal to the separation plane.

In this configuration, a direction in which the ridges are interconnected with each other becomes parallel to a longitudinal direction on a cross-section (a plane orthogonal to the axial direction of the shaft portion) of the grip portion. In short, a portion of the cleaner main body which overlaps with the shaft main body in a direction orthogonal to the longitudinal direction of a cross-section (at the plane orthogonal to the axial direction of the shaft portion) of the grip portion is thicker than a portion of the cleaner main body which overlaps with the ridge in a direction in parallel to the longitudinal direction of the cross-section of the grip portion.

Specifically, when cleaning an interdental space between molar teeth, the cleaning portion is likely to be disposed to clean the interdental space in a posture that the longitudinal direction on the cross-section (on the plane orthogonal to the axial direction of the shaft portion) of the grip portion is parallel to a substantially vertical direction. The grip portion is often operated to press the cleaning portion relatively strongly to a side surface of each of the molar teeth to effectively clean the side surface.

The cleaner main body of the interdental cleaning tool manufactured by the method has a relatively large thickness of a portion which comes into contact with the side surface of the molar tooth, so that the portion is likely to be elastically deformed from the shaft portion. This configuration prevents the shaft portion from being broken because of deformation of the shaft portion resultant from the deformation of the cleaner main body during the cleaning of the interdental space.

With regard to the method for manufacturing an interdental cleaning tool, it is preferable that what is used as the primary mold in the base forming step has a distance between the first spaced-apart portions and a distance between the second spaced-apart portions in a direction parallel to the separation plane, each of the distances being larger than a distance between the first and second connection portions in a direction orthogonal to the separation plane.

Accordingly, the shaft portion is formed in the base portion forming step so that there is a smaller size in a direction orthogonal to an interconnection direction of the ridges of the shaft portion than a distance between the ridges. As a result, there is enhanced insertability of the interdental cleaning tool into the relatively narrow interdental space between the molar teeth.

As described above, the present invention may provide a method for manufacturing an interdental cleaning tool, the method making it possible to prevent a shaft portion of the tool from being broken when a base portion is ejected from a mold.

DESCRIPTION OF EMBODIMENTS

A method for manufacturing an interdental cleaning tool 2 according to an embodiment of the present invention is described with reference to FIGS. 1 to 5. Hereinafter, the interdental cleaning tool 2 is firstly described, and then, a method for manufacturing the interdental cleaning tool 2 is described.

Figure 1:
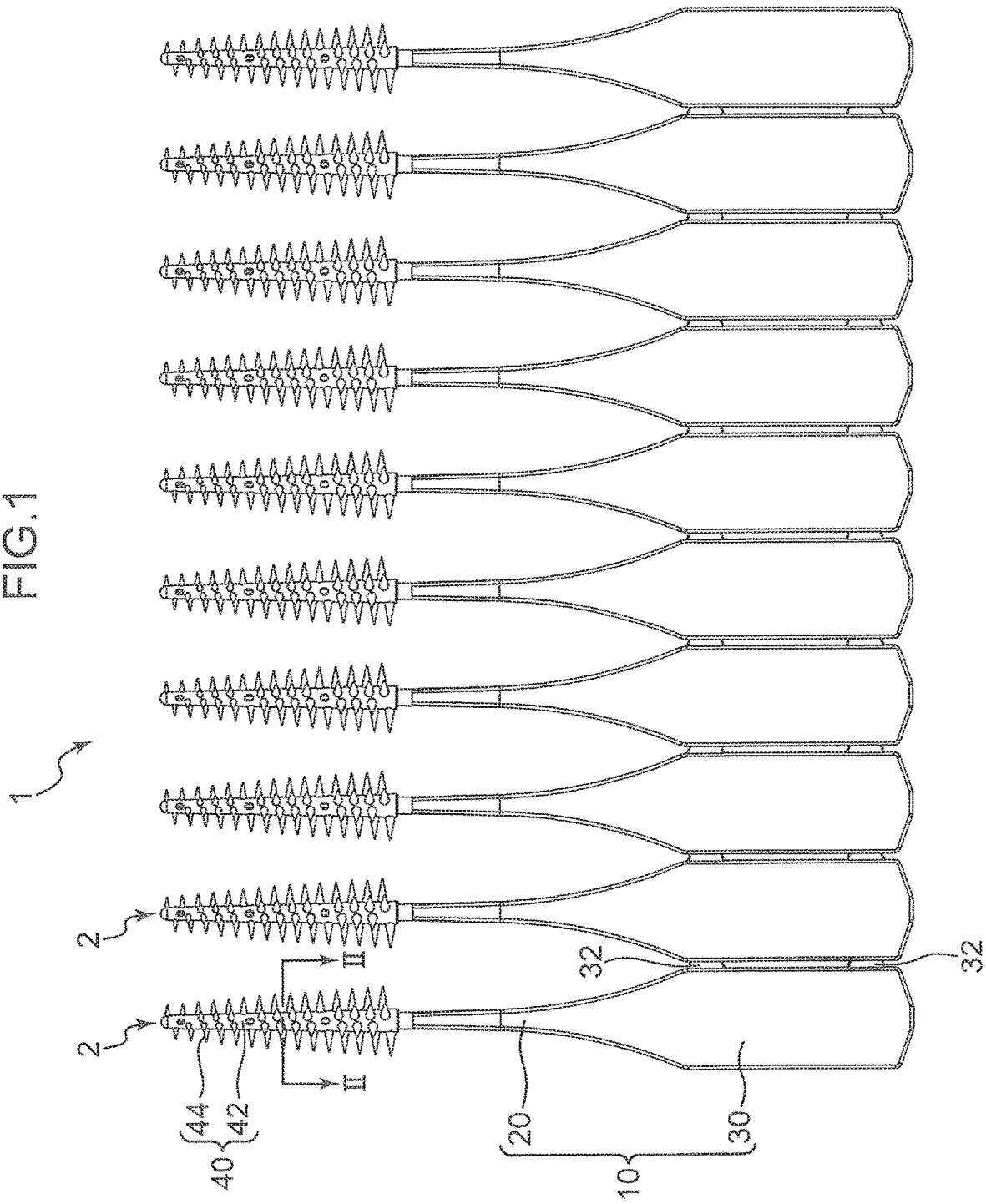
FIG. 1 is a front view of an interdental cleaning tool group including an interdental cleaning tool according to an embodiment of the present invention.

FIG. 1 shows an interdental cleaning tool group 1 including a plurality of (ten in this embodiment) interdental cleaning tools 2. Adjacent interdental cleaning tools 2 are connected to each other by a joining portion 32. Each of the interdental cleaning tools 2 includes a base portion 10 made of synthetic resin, and a cleaning portion 40 made of elastomer having a lower hardness than the synthetic resin.

The base portion 10 is made of a synthetic resin such as polypropylene, polyethylene, ABS, polybutylene terephthalate, polycarbonate, polyethylene terephthalate, polystyrene or polyacetal. With regard to this embodiment, the base portion 10 is made of polypropylene containing 30% by weight of glass fibers. The base portion 10 has a shaft portion 20 and a grip portion 30.

Figure 2:
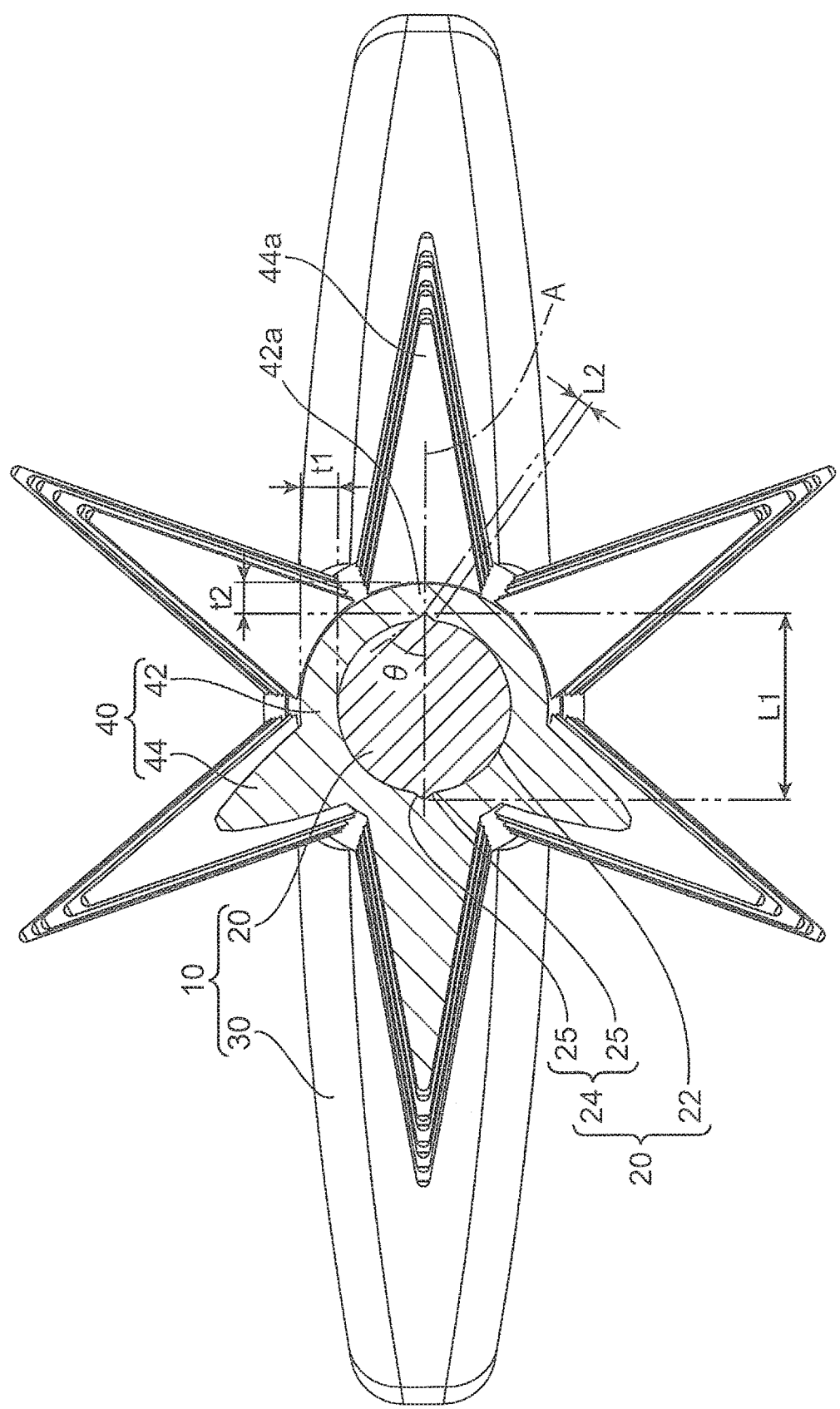
FIG. 2 is a cross-sectional view taken along line II-II of FIG. 1

The shaft portion 20 has a shape which extends straight in a specific direction (left-right direction in FIG. 1) to be inserted into an interdental space. The shaft portion 20 has an insertion distal end on one end (left end in FIG. 1) and a proximal end on the other end (right end in FIG. 1). The shaft portion 20 has an outer shape gradually tapering from the proximal end to the insertion distal end. FIG. 2 shows cross-sections (hereinafter, referred to as "axis-orthogonal cross-section") of the shaft portion 20 and the cleaning portion 40 on a plane orthogonal to an axial direction of the shaft portion 20. As shown in FIG. 2, the shaft portion 20 has a shaft main body 22 and two ridges 24.

The shaft main body 22 has a circular outer shape on the axis-orthogonal cross-section.

The ridges 24 protrude outward from the circumferential surface of the shaft main body 22 in an axis-orthogonal direction orthogonal to the axial direction of the shaft main body 22, and extend in the axial direction. The ridges 24 are apart from each other at an angle of 180° in the circumferential direction of the shaft main body 22. Each of the ridges 24 has such a shape that sizes in a second direction (left-right direction in FIG. 2) orthogonal to the axial direction and a first direction (up-down direction in FIG. 2) in which the ridges 24 are interconnected with each other gradually decreases as the ridge 24 becomes more distant from the shaft main body 22. With regard to this embodiment, the ridge 24 has a pair of flat surfaces 25, each of which inclines so as to come closer to a plane encompassing the straight line "A" as the flat surfaces 25 is more distant from the shaft main body 22, the straight line "A" being in parallel to the first direction and extending through the central axis of the shaft main body 22. As shown in FIG. 2, an angle θ between each of the flat surfaces 25 and the line "A" is acute. The angle θ is preferably set at no less than 10° to no more than 89.5°, more preferably at no less than 40° to no more than 89°. The angle θ is set at 55° in this embodiment. A ratio of the size L2 of the flat surface 25 to the size L1 between the vertexes of the ridges 24 is preferably set at no less than 0.3% to no more than 30%, more preferably at no less than 0.5% to no more than 10%, and even more preferably at no less than 0.7% to no more than 10%. The lower limit of the ratio of the size L1 to the diameter of the shaft portion 20 in the second direction is preferably set at no less than 80%, and more preferably at more than 100%, e.g., 100.01% or more. The upper limit of the ratio of the size L1 to the diameter of the shaft portion 20 in the second direction is preferably set at no more than 110%.

The grip portion 30 extends away from the proximal end of the shaft portion 20 in the axial direction of the shaft portion 20, and has a shape to be gripped by fingers. The grip portion 30 has a flat plate shape. In detail, as shown in FIG. 2, the grip portion 30 is connected to the proximal end so that a longitudinal direction on the cross-section (hereinafter, referred to as "grip-portion-orthogonal cross-section") of the grip portion 30 on a plane, which is parallel to the axis-orthogonal direction and extends through the grip portion 30, becomes parallel to the first direction (i.e. the direction connecting the ridges to each other).

The cleaning portion 40 is a portion for cleaning an interdental space, and is made of elastomer having a lower hardness than the base portion 10. With regard to this embodiment, the elastomer includes styrene-based elastomer. However, the elastomer may include, for example, silicon, olefin-based elastomer, polyester-based elastomer and so on. With regard to this embodiment, the cleaning portion 40 includes a cleaner main body 42 and a plurality of brush portions 44. The elastomer preferably has durometer hardness type A (JISK6253) of 10 to 50. With regard to this embodiment, the durometer hardness type A is 35.

The cleaner main body 42 covers at least a part (including the insertion distal end) of the circumferential surface of the shaft portion 20. The cleaner main body 42 is 15.5 mm in length in the axial direction of the shaft portion 20. As shown in FIG. 2, the cleaner main body 42 has an annular outer shape on the axis-orthogonal cross-section. The cleaner main body 42 includes an overlapping portion 42a, which overlaps with the ridge 24 in a direction parallel to the first direction on the axis-orthogonal cross-section. Thickness t2 of the overlapping portion 42a is smaller than thickness t1 of a portion of the cleaner main body 42 other than the overlapping portion 42a. A ratio of the thickness t2 to the thickness t1 is preferably set at no less than 75% to no more than 99.95%.

The brush portions 44 protrude outward from the circumferential surface of the cleaner main body 42 in the axis-orthogonal direction. With regard to this embodiment, each of the brush portions 44 has a cone shape. As shown in FIG. 2, the brush portions 44 include a supported bristle 44a protruding outward from the overlapping portion 42a in the radial direction of the shaft portion 20. The supported bristle 44a is supported by the ridge 24. In this configuration, the supported bristle 44a is less elastically deformable than the other brush portions 44.

Figure 3:
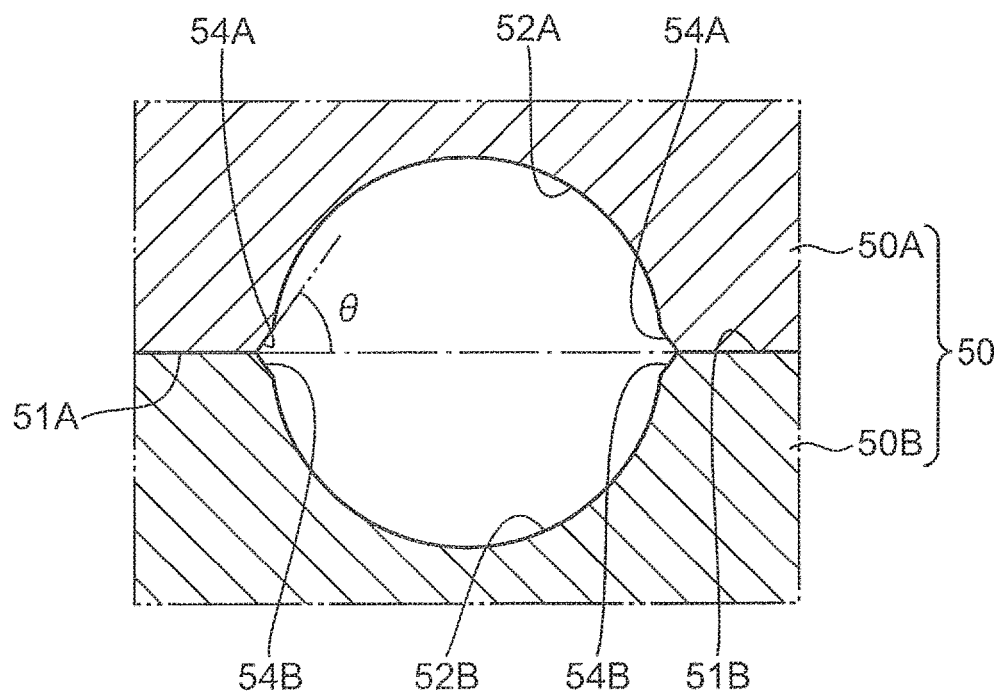
FIG. 3 is a cross-sectional view of a primary mold (including a first mold member and a second mold member).
Figure 4:
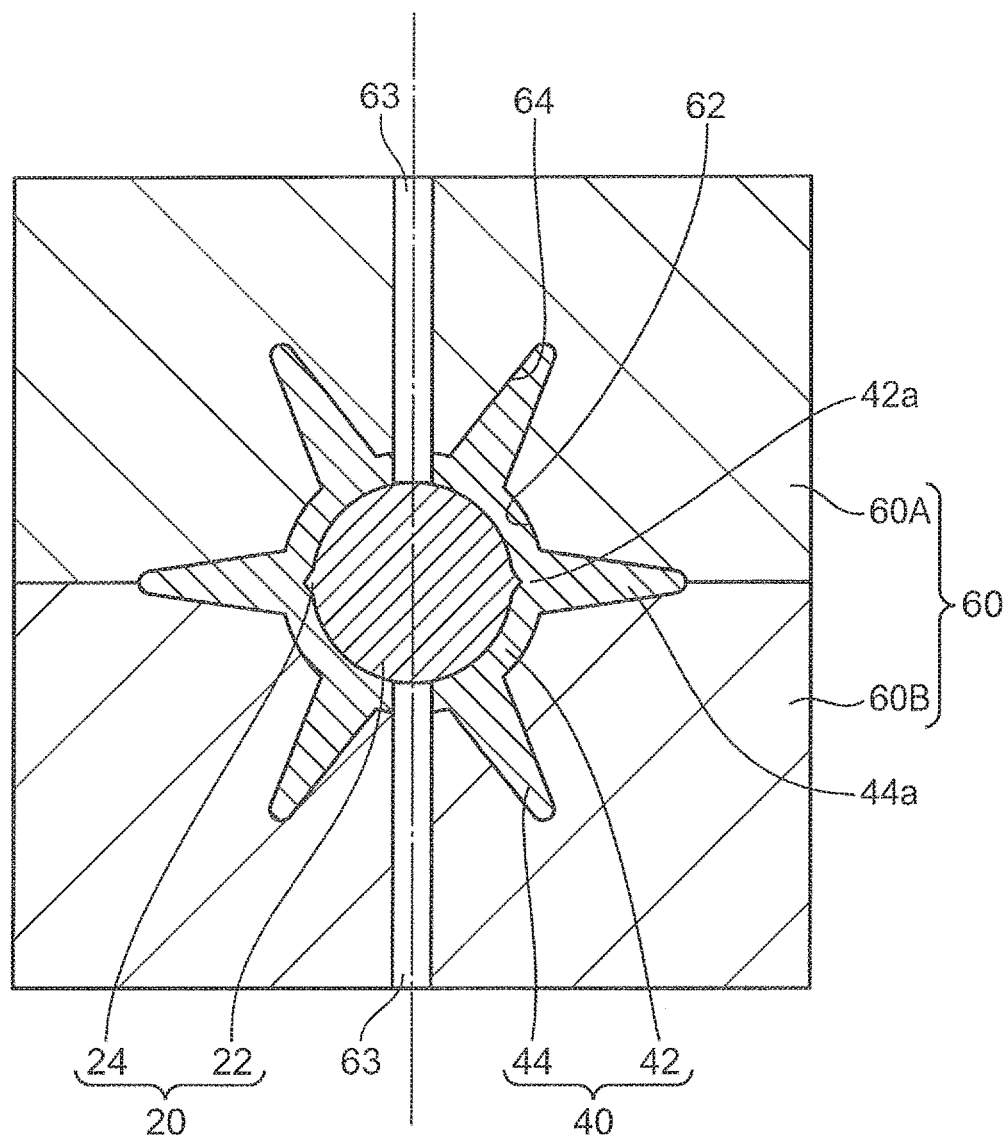
FIG. 4 is a cross-sectional view of a secondary mold.

Next, the method for manufacturing the interdental cleaning tool 2 is described with reference to FIGS. 3 and 4. The method includes a base portion forming step of forming the base portion 10 by using a synthetic resin (polypropylene containing 30% by weight of glass fibers in this embodiment), and a cleaning portion forming step of forming the cleaning portion 40 by using elastomer.

In the base portion forming step, the base portion 10 is formed by using a primary mold 50 (c.f. FIG. 3) having a first space in correspondence to the base portion 10 and filling the first space with the synthetic resin. FIG. 3 shows a cross-sectional view of the primary mold 50 on a plane in correspondence to the axis-orthogonal cross-section. The primary mold 50 includes a first mold member 50A and a second mold member 50B which are separable from each other on a separation plane that is a reference plane of the shaft portion 20, the reference plane encompassing the central axis of the shaft portion 20 and being parallel to the line "A" connecting the ridges 24 with each other.

The first mold member 50A includes: a first contact surface 51A coming into surface contact with the second mold member 50B; a first shaft main body forming portion 52A for forming a part of the shaft main body 22 on one side of the reference plane; and a pair of first ridge forming portions 54A for partially forming the respective ridges 24 on the one side of the reference plane. The first contact surface 51A is flat, and defines the separation plane. Each of the first ridge forming portions 54A has a flat surface which becomes gradually more distant from the separation plane as the flat surface is more distant from the first contact surface 51A along the separation plane. An angle θ between the first ridge forming portion 54A and the separation plane is acute. The first shaft main body forming portion 52A has a convex shape which is distant from the separation plane in a direction (up-down direction in FIG. 3) perpendicular to the separation plane, and connects the first ridge forming portions 54A with each other. In short, the first ridge forming portion 54A constitutes "the first spaced-apart portion", and the first shaft main body forming portion 52A constitutes "the first connection portion" in this embodiment. The angle θ between the first ridge forming portion 54A and the separation plane is preferably set at no less than 10° to no more than 89.5°, and more preferably at no less than 40° to no more than 89°, similar to the angle θ between the flat surface 25 and the line "A" as shown in FIG. 2. The angle θ is set at 55° in this embodiment.

The second mold member 50B includes: a second contact surface 51B coming into surface contact with the first contact surface 51A; a second shaft main body forming portion 52B for forming the other part of the shaft main body 22 on the other side of the reference plane; and a pair of second ridge forming portions 54B for forming the other part of the respective ridges 24 on the other side of the reference plane. The second and first mold members 50B, 50A are symmetric with each other about the separation plane. In short, the second ridge forming portion 54B constitutes "the second spaced-apart portion" and the second shaft main body forming portion 52B constitutes "the second connection portion".

In the base portion forming step, the base portion 10 is formed by filling the space between the first and second mold members 50A, 50B. In detail, the base portion forming step includes: filling the first space defined by the first and second mold members 50A, 50B with the synthetic resin; separating the first and second mold members 50A, 50B from each other; and ejecting the base portion 10 remaining in either of the first and second mold members 50A, 50B from the mold under a condition in which the grip portion 30 of the base portion 10 is gripped.

The first mold member 50 A forming the acute angle θ between each of the first ridge forming portions 54A (first spaced-apart portions) and the separation plane, and the second mold member 50 B forming the acute angle θ between each of the second ridge forming portions 54B (second spaced-apart portions) and the separation plane are used as the primary mold 50 in this embodiment. This configuration makes it possible to reduce a force applied to the shaft portion 20 when the base portion 10 remains in either of the first and second mold members 50A, 50B from the mold under a condition in which the grip portion 30 of the base portion 10 is gripped, after the first and second mold members 50A, 50B are separated from each other in the base portion forming step. In this manner, the shaft portion 20 is prevented from being broken when the base portion 10 is ejected from the primary mold 50 in the base portion forming step.

Subsequently, the cleaning portion forming step to be executed after the base portion forming step uses a secondary mold 60 (c.f. FIG. 4) configured to hold the base portion 10 and having a shape forming a second space in correspondence to the cleaning portion 40 around the shaft portion 20 under a condition in which the secondary mold 60 holds the base portion 10. In detail, in the cleaning portion forming step, the cleaning portion 40 is formed around the shaft portion 20 by filling the second space with the elastomer under a condition in which the secondary mold 60 holds the base portion 10. The secondary mold 60 includes a pair of molding members 60A, 60B separable from each other. The secondary mold 60 includes a cleaner main body forming portion 62 for forming the cleaner main body 42 around the shaft portion 20, and a brush portion forming portion 64 for forming the brush portions 44. In this step, firstly, the secondary mold 60 holds the base portion 10 in a posture that the longitudinal direction (i.e. interconnection direction of the ridges) on the grip-portion-orthogonal cross-section of the grip portion 30 is parallel to the separation plane of the secondary mold 60. In this case, the shaft portion 20 is retained by a retaining pin 63. The second space is filled with the elastomer in this state. The cleaning portion 40 is consequently formed around the shaft portion 20. Specifically, the supported bristle 44a constituting a part of the brush portions 44a is formed at a position at which the ridges 24 overlap with each other in the interconnection direction of the ridges 24. Although the interdental cleaning tool 2 shown in FIG. 2 is not configured to include six brush portions 44 arranged one after another in the circumferential direction of the shaft portion 20 on a specific axis-orthogonal cross-section, six brush portions 44 arranged in the circumferential direction are shown in FIG. 4 only for explanation.

The interdental cleaning tool 2 is manufactured by the aforementioned steps. With regard to the interdental cleaning tool 2, a relative rotation of the cleaning portion 40 to the shaft portion 20 in the circumferential direction of the shaft portion 20 is suppressed. In detail, an inwardly convex shape are formed at a boundary between the shaft main body 22 and the ridges 24 of the circumferential surface of the shaft portion 20. The boundary restricts a rotation of the cleaning portion 40 around the shaft portion 20 to suppress a relative rotation of the cleaning portion 40 to the shaft portion 20 in the circumferential direction.

The cleaner main body 42 is formed so that the thickness t2 of the overlapping portion 42a of the cleaner main body 42 is smaller than the thickness t1 of the other part of the cleaner main body 42. In short, the cleaner main body 42 is formed to consequently have a relatively hard section and a relatively soft section. A user of the interdental cleaning tool 2 thus may change feeling of use.

Figure 5:
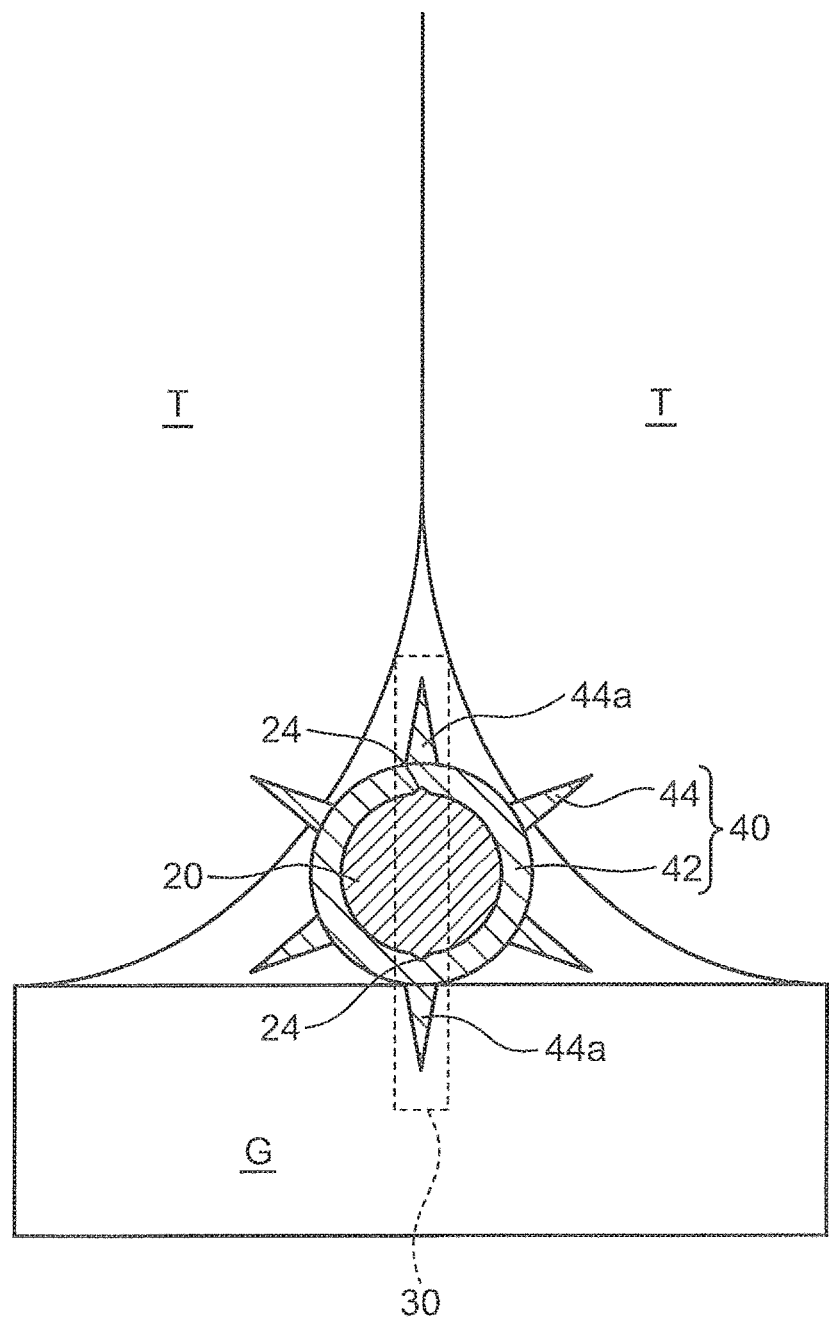
FIG. 5 is a schematic view showing a state that the interdental cleaning tool is inserted into an interdental space between molar teeth (back teeth).

As shown in FIG. 5, specifically when cleaning an interdental space between molar teeth (back teeth) T, the cleaning portion 40 is likely to be disposed to clean the interdental space in a posture that the longitudinal direction on the grip-portion-orthogonal cross-section of the grip portion 30 having a flat plate shape is parallel to a substantially vertical direction. The grip portion 30 is often operated to press the cleaning portion 40 relatively strongly to a side surface of each of the molar teeth T to effectively clean the side surface.

The cleaner main body 42 of the interdental cleaning tool 2 manufactured by the method has the relatively thick portion which comes into contact with the side surface of the molar tooth T. The section is therefore elastically deformable from the shaft portion 20. This configuration prevents the shaft portion 20 from being broken due to deformation of the shaft portion 20 resultant from the deformation of the cleaner main body 42 during the cleaning of the interdental space.

The shaft portion 20 is formed in the base portion forming step so that the shaft portion 20 has the larger size L1 between the ridges 24 of the shaft portion 20 than the size in the direction orthogonal to the size L1. As a result, the insertabiltiy of the interdental cleaning tool 2 into the relatively narrow interdental space between the molar teeth T is enhanced.

Additionally, the brush portions 44 including the supported bristle 44a make it possible to more effectively clean an upper region of an interdental space between molar teeth of a lower jaw, and a lower region of an interdental space between molar teeth of an upper jaw, the regions particularly being hard to be cleaned.

The embodiment disclosed herein is merely an example in each aspect and should not be considered restrictively. The scope of the invention is not defined in the above description of the embodiment but is defined in claims and includes meanings equivalent to the claims and all modifications in the scope of the claims.

Figure 6:
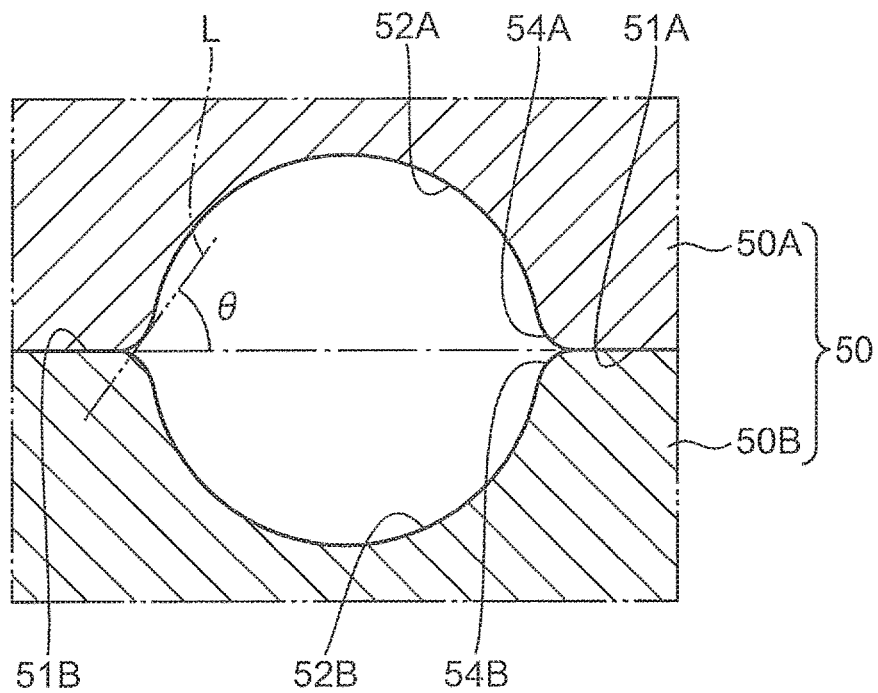
FIG. 6 is a cross-sectional view of a modified primary mold (including a first mold member and a second mold member).

For example, as shown in FIG. 6, each of the first ridge forming portions 54A and the second ridge forming portions 54B may have a convex surface gradually more distant from the separation plane as the convex surface is more distant from the first contact surface 51A along the separation plane. In this case, the first and second ridge forming portions 54A, 54B respectively have such shapes that an angle θ between a tangential plane at a vertex of the first ridge forming portion 54A and the separation plane is acute, and an angle θ between a tangential plane at a vertex of the second ridge forming portion 54B and the separation plane is acute. The angle θ is preferably set at no less than 10° to no more than 89.5°, and more preferably at no less than 40° to no more than 89°. The angle θ is set at 55° in this modification.

Figure 7:
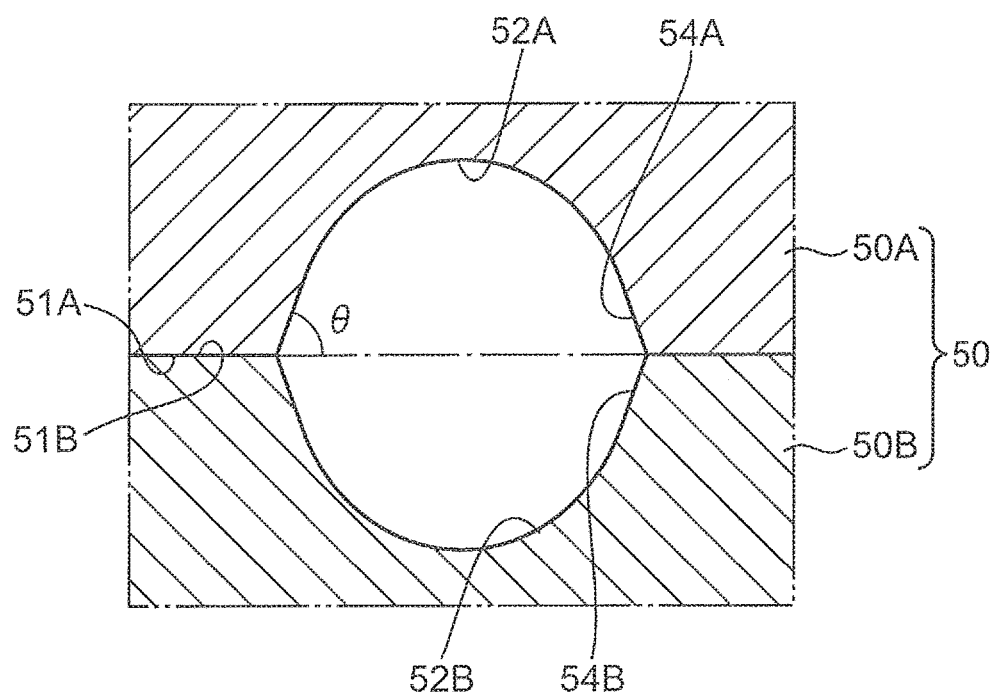
FIG. 7 is a cross-sectional view of another modified primary mold (including a first mold member and a second mold member).

Alternatively, as shown in FIG. 7, a distance between the first ridge forming portions 54A and a distance between the second ridge forming portions 54B on a cross-section (in the cross-section of the primary mold 50 on a plane in correspondence to the axis-orthogonal cross-section) shown in FIG. 7, and an angle θ between the separation plane and each of the first ridge forming portions 54A and the second ridge forming portions 54B may be set so that the distance between the outer ends of the first spaced-apart portions 54A (second spaced-apart portions 54B) in a direction (left-right direction of FIG. 7) parallel to the separation plane is smaller than the distance between the connection portions 52A, 52B in a direction (up-down direction in FIG. 7) orthogonal to the separation plane.

The cross-section of the primary mold 50 in the axis-orthogonal direction may have a polygonal shape with vertexes at a corner defined by one of the first ridge forming portions 54A and one of the second ridge forming portions 54B and another corner defined by the other of the first ridge forming portions 54A and the other of the second ridge forming portions 54B.

The primary mold 50 and the secondary mold 60 may have an integral configuration as far as the shaft portion 30 is allowed to be moved from the first space to the second space under a condition in which the grip portion 30 is gripped.

The shaft portion 20 may have another support section for supporting the brush portions 44 other than the supported bristle 44a.

The shaft portion 20 may be formed with a surface texturing. This processing may prevent the cleaning portion 40 from separating from the shaft portion 20. The whole base portion 10 may be also formed with a surface texturing.

The shape of the brush portion 44 should not be limited to the cone, but may be a flat plate.

Further, the shape of the grip portion 30 should not be limited to the flat plate, but may be a right circle or rectangular shape.

Additionally, the first spaced-apart portions and the second spaced-apart portions may be formed in the whole of the separation plane.

EXPLANATION OF REFERENCE NUMERALS 1 interdental cleaning tool group
2 interdental cleaning tool
10 base portion
20 shaft portion
22 shaft main body
24 ridge
25 flat surface
30 grip portion
40 cleaning portion
42 cleaner main body
42a overlapping portion
44 brush portion
44a supported bristle
50 primary mold
50A first mold member
50B second mold member
51A first contact surface
51B second contact surface
52A first shaft main body forming portion (first connection portion)
52B second shaft main body forming portion (second connection portion)
54A first ridge forming portion (first spaced-apart portion)
54B second ridge forming portion (second spaced-apart portion).
60 secondary mold
62 cleaner main body forming portion
64 brush portion forming portion

The invention claimed is:

1. A method for manufacturing an interdental cleaning tool including: a base portion having a shaft portion, which extends in a specific direction and has a shape to be inserted into an interdental space, and a grip portion, which is connected to the shaft portion and has a shape to be gripped by fingers; and a cleaning portion configured to clean the interdental space and covering at least a part of the shaft portion, the method comprising:
a base portion forming step of forming the base portion by using a primary mold having a first space in correspondence to the base portion and filling the first space with a synthetic resin, the primary mold including a first mold member and a second mold member separable from each other on a separation plane which is a reference plane encompassing an axis of the shaft portion; and
a cleaning portion forming step of forming the cleaning portion around the shaft portion by using a secondary mold configured to hold the base portion and having a shape forming a second space in correspondence to the cleaning portion around the shaft portion, and filling the second space with elastomer under a condition in which the secondary mold holds the base portion,
wherein what is used as the first mold member in the base portion forming step includes a first contact surface defining the separation plane and coming into contact with the second mold member; a pair of first spaced-apart portions, each of which has a flat surface that becomes gradually more distant from the separation plane as the flat surface becomes more distant along the separation plane from the first contact surface; and a first connection portion which connects the first spaced-apart portions with each other and has a shape that is convex so as to become more distant from the separation plane in a direction perpendicular to the separation plane, an angle between each of the first spaced-apart portions and the separation plane being acute, and
wherein what is used as the second mold member in the base portion forming step includes a second contact surface defining the separation plane and coming into contact with the first contact surface; a pair of second spaced-apart portions, each of which has a flat surface that becomes gradually more distant from the separation plane as the flat surface becomes more distant along the separation plane from the second contact surface; and a second connection portion, which connects the second spaced-apart portions with each other and has a shape that is convex so as to become more distant from the separation plane in a direction perpendicular to the separation plane, an angle between each of the second spaced-apart portions and the separation plane being acute.

2. The method for manufacturing an interdental cleaning tool according to claim 1,
wherein what is used as the first mold member includes the first connection portion which has a curved shape that is convex so as to become more distant from the separation plane in a direction perpendicular to the separation plane, and what is used as the second mold member includes the second connection portion which has a curved shape that is convex so as to become more distant from the separation plane in a direction perpendicular to the separation plane.

3. A method for manufacturing an interdental cleaning tool including: a base portion having a shaft portion, which extends in a specific direction and has a shape to be inserted into an interdental space, and a grip portion, which is connected to the shaft portion and has a shape to be gripped by fingers; and a cleaning portion configured to clean the interdental space and covering at least a part of the shaft portion, the method comprising:
a base portion forming step of forming the base portion by using a primary mold having a first space in correspondence to the base portion and filling the first space with a synthetic resin, the primary mold including a first mold member and a second mold member separable from each other on a separation plane which is a reference plane encompassing an axis of the shaft portion; and a cleaning portion forming step of forming the cleaning portion around the shaft portion by using a secondary mold configured to hold the base portion and having a shape forming a second space in correspondence to the cleaning portion around the shaft portion, and filling the second space with elastomer under a condition in which the secondary mold holds the base portion, wherein what is used as the first mold member in the base portion forming step includes a first contact surface defining the separation plane and coming into contact with the second mold member; a pair of first spaced-apart portions, each of which has a surface curved so as to be convex toward the separation surface, the surface becoming gradually more distant from the separation plane as the surface becomes more distant along the separation plane from the second contact surface; and a first connection portion, which connects the first spaced-apart portions with each other and has a curved shape that is convex so as to become more distant from the separation plane in a direction perpendicular to the separation plane, an angle between a tangential plane at a vertex of each of the first spaced-apart portions and the separation plane being acute, and wherein what is used as the second mold member in the base portion forming step includes a second contact surface defining the separation plane and coming into contact with the first contact surface; a pair of second spaced-apart portions, each of which has a surface curved so as to be convex toward the separation surface, the surface being gradually more distant from the separation plane as the surface becomes more distant along the separation surface from the second contact surface; and a second connection portion, which connects the second spaced-apart portions with each other and has a curving shape that is convex so as to become more distant from the separation plane in a direction perpendicular to the separation plane, an angle between a tangential plane at a vertex of each of the second spaced-apart portions and the separation plane being acute.

4. The method for manufacturing an interdental cleaning tool according to claim 2, wherein what is used as the secondary mold in the cleaning portion forming step includes a cleaner main body forming portion for forming a cleaner main body which constitutes a part of the cleaning portion and covers at least a part of a circumferential surface of the shaft portion; and a brush portion forming portion for forming a plurality of brush portions which constitute another part of the cleaning portion and respectively protrude outward from a circumferential surface of the cleaner main body in directions orthogonal to an axial direction of the shaft portion, and wherein in the cleaning portion forming step, the second space is filled with the elastomer under a condition in which the secondary mold holds the base portion so that a ridge formed by the first spaced-apart portion and the second spaced-apart portion in the base forming step overlaps with a part of the brush portion forming portion in an axis-orthogonal direction which is orthogonal to the axial direction of the shaft portion.

5. The method for manufacturing an interdental cleaning tool according to claim 4, wherein what is used as the secondary mold in the cleaning portion forming step is configured to form the cleaner main body having a thinner portion which overlaps with the ridge in the axis-orthogonal direction than another part of the cleaner main body, which overlaps in the axis-orthogonal direction with a shaft main body formed by the first connection portion and the second connection portion in the base portion forming step.

6. The method for manufacturing an interdental cleaning tool according to claim 5, wherein what is formed in the cleaning portion forming step has a ratio of no less than 75% and no more than 99.95% of the portion which overlaps with the ridge in the axis-orthogonal direction to the part of the cleaner main body overlapping in the axis-orthogonal direction with the shaft main body.

7. The method for manufacturing an interdental cleaning tool according to claim 6, wherein the base portion is formed in the base forming step so that the grip portion has a larger size in a direction in parallel to the separation plane than a size in a direction orthogonal to the separation plane.

8. The method for manufacturing an interdental cleaning tool according to claim 6, wherein what is used as the primary mold in the base forming step has a distance between the first spaced-apart portions and a distance between the second spaced-apart portions in a direction parallel to the separation plane, each of the distances being larger than a distance between the first and second connection portions in a direction orthogonal to the separation plane.

9. The method for manufacturing an interdental cleaning tool according to claim 3, wherein what is used as the secondary mold in the cleaning portion forming step includes a cleaner main body forming portion for forming a cleaner main body which constitutes a part of the cleaning portion and covers at least a part of a circumferential surface of the shaft portion; and a brush portion forming portion for forming a plurality of brush portions which constitute another part of the cleaning portion and respectively protrude outward from a circumferential surface of the cleaner main body in directions orthogonal to an axial direction of the shaft portion, and wherein in the cleaning portion forming step, the second space is filled with the elastomer under a condition in which the secondary mold holds the base portion so that a ridge formed by the first spaced-apart portion and the second spaced-apart portion in the base forming step overlaps with a part of the brush portion forming portion in an axis-orthogonal direction which is orthogonal to the axial direction of the shaft portion.

* * * * *